US012332955B2

(12) United States Patent
Bright et al.

(10) Patent No.: US 12,332,955 B2
(45) Date of Patent: Jun. 17, 2025

(54) IDENTITY VERIFICATION APPLICATION

(71) Applicants: Scott Bright, Walnut Creek, CA (US); Anthony Bu, Walnut Creek, CA (US)

(72) Inventors: Scott Bright, Walnut Creek, CA (US); Anthony Bu, Walnut Creek, CA (US)

(*) Notice: Subject to any disclaimer, the term of this patent is extended or adjusted under 35 U.S.C. 154(b) by 0 days.

(21) Appl. No.: 18/520,738

(22) Filed: Nov. 28, 2023

(65) Prior Publication Data
US 2024/0176832 A1    May 30, 2024

Related U.S. Application Data

(60) Provisional application No. 63/428,196, filed on Nov. 28, 2022.

(51) Int. Cl.
*G06F 16/9535* (2019.01)
*G06Q 50/26* (2024.01)

(52) U.S. Cl.
CPC ....... *G06F 16/9535* (2019.01); *G06Q 50/265* (2013.01)

(58) Field of Classification Search
CPC .......................... G06F 16/9535; G06Q 50/265
See application file for complete search history.

(56) References Cited

U.S. PATENT DOCUMENTS

| 1,113,692 | A | * | 10/1914 | Ran | H05B 7/103 314/57 |
| 6,871,287 | B1 | * | 3/2005 | Ellingson | G06Q 20/4012 705/72 |
| 10,348,726 | B2 | * | 7/2019 | Caluwaert | G06F 21/602 |
| 2014/0304183 | A1 | * | 10/2014 | Zabar | G06Q 50/265 705/321 |
| 2016/0307156 | A1 | * | 10/2016 | Burner | G06Q 50/265 |
| 2019/0073676 | A1 | * | 3/2019 | Wang | H04W 4/029 |
| 2022/0182346 | A1 | * | 6/2022 | Yarnall | H04L 51/52 |
| 2022/0358125 | A1 | * | 11/2022 | Scholak | G06F 16/24522 |

* cited by examiner

*Primary Examiner* — Angelica Ruiz
(74) *Attorney, Agent, or Firm* — Brennan, Manna & Diamond, LLC

(57) ABSTRACT

An identity verification application device is disclosed that provides the ability to utilize a mobile application or website to integrate multiple data sources to verify an individual's identity, criminal background, social media platform enrollment, and other data pertaining to said individual. The identity verification application device comprises user input of data fields, directly from a user or via an API. This data is then sent to third party data sources to locate person records and/or criminal background information. The results received determine if additional third party data sources are required. After all data is received from the multiple data sources, the data is inputted into the software application platform. Final results are then received and inaccurate data is filtered out. A full report is then provided to the user.

19 Claims, 5 Drawing Sheets

IDENTITY VERIFICATION APPLICATION

CROSS-REFERENCE TO RELATED APPLICATION

The present application claims priority to, and the benefit of, U.S. Provisional Application No. 63/428,196, which was filed on Nov. 28, 2022, and is incorporated herein by reference in its entirety.

FIELD OF THE INVENTION

The present invention relates generally to the field of identity verification application devices. More specifically, the present invention relates to a software application that utilizes multiple data sources to verify an individual's identity, criminal background, and social media platform enrollments. Accordingly, the present disclosure makes specific reference thereto. Nonetheless, it is to be appreciated that aspects of the present invention are also equally applicable to other like applications, devices and methods of manufacture.

BACKGROUND

By way of background, this invention relates to improvements in identity verification application devices. Generally, people may enjoy going onto social platforms and/or online dating platforms, but after meeting a person online may be hesitant to meet them in person. A user would require a means for verifying their background and identity, as well as a means for determining if the person had any criminal infractions to remove a user's chances of falling victim to physical harm, financial harm, romance scams, fraud, and criminal deviants.

Furthermore, users, such as Online marketplaces, Real estate agents, and in-home care workers looking to protect themselves would also want a means for verifying an individual's identity, criminal background, and/or social media enrollment. Additionally, such users would want a means for verifying such information without requiring prior consent of the individual being searched. Accordingly, users would want to utilize such verifications that are not subject to the Fair Credit Reporting Act (FCRA), meaning the information provided in each check is based on publicly available information or general knowledge, and therefore does not require prior consent of the person being searched.

Accordingly, there is a demand for an improved identity verification application device that allows users to input data points about a person they want to verify and obtain a background check. More particularly, there is a demand for an identity verification application device that integrates multiple data sources to verify an individual's identity, criminal background, social media platform enrollment, and other data pertaining to said individual.

Therefore, there exists a long felt need in the art for an identity verification application device that provides users with a cloud-based solution that uses proprietary logic and application programming interfaces (API's) to send and receive data from multiple public record data sources to deliver results on an individual. There is also a long felt need in the art for an identity verification application device that allows users to sign up and use minimal information on an individual to conduct a thorough public safety check to help determine if a user would like to meet the individual in person. Further, there is a long felt need in the art for an identity verification application device that takes the data from the user to sanitize the data to ensure the information sent to the third party data sources has the highest rate of person location and accuracy. Moreover, there is a long felt need in the art for a device that compares the data fields entered by the user and the data results from the multiple data sources to ensure accuracy received before the report is provided to the user. Further, there is a long felt need in the art for an identity verification application device that does not require prior consent of the individual being searched. Finally, there is a long felt need in the art for an identity verification application device that provides users with identity verification and background checks for the purpose of public safety and fraud mitigation.

The subject matter disclosed and claimed herein, in one embodiment thereof, comprises an identity verification application device. The device provides the ability to utilize a mobile application or website to integrate multiple data sources to verify an individual's identity, criminal background, social media platform enrollment, and other data pertaining to said individual. The identity verification application device comprises user input of data fields, directly from a user or via an API. This data is then sent to third party data sources to locate person records and/or criminal background information. The results received determine if additional third party data sources are required. After all data is received from the multiple data sources, the data is inputted into the software application platform. Final results are then received and inaccurate data is filtered out. A full report is then provided to the user.

In this manner, the identity verification application device of the present invention accomplishes all of the forgoing objectives and provides users with a means for performing identity verification and non-intrusive background checks on on-line individuals. The device is a software application that uses proprietary logic and APIs to conduct non-intrusive background checks. The background checks are performed for public safety and fraud mitigation.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an identity verification application device. The device provides the ability to utilize a mobile application or website to integrate multiple data sources to verify an individual's identity, criminal background, social media platform enrollment, and other data pertaining to said individual. The identity verification application device comprises user input of data fields, directly from a user or via an API. This data is then sent to third party data sources to locate person records and/or criminal background information. The results received determine if additional third party data sources are required. After all data is received from the multiple data sources, the data is inputted into the software application platform. Final results are then received and inaccurate data is filtered out. A full report is then provided to the user.

In one embodiment, the identity verification application device utilizes a smartphone, a tablet, a laptop or a desktop computer, etc., or any other suitable electronic device that has the required operating and memory parameters to support the software application of the present invention.

In one embodiment, the identity verification application device comprises a mobile computing device (i.e., smart phone, computer, tablet, etc.) comprising a software application for using proprietary logic and APIs to conduct person verification and non-intrusive background checks for users for public safety. The mobile or software application provides secure website and/or smart phone app access by users for identity verification of individuals. In addition to these elements, the device of the present invention may also include: a web server and Cloud database of third party data sources, proprietary logic, and APIs, connectable to the mobile smartphone or portable tablet or computer device for conducting the person verification and non-intrusive background checks.

In one embodiment of the invention, the person records and third party data sources and data management software is maintained on a AWS Cloud server in a typical fashion, or other cloud server, such as the Adobe, Apple or Amazon cloud server, etc. A secure cloud server is used for the protection and security of users and for the individual information data stored on the cloud server. Thus, the individual information, such as person verification data, background check, and social media platform presence, is sent to the cloud server and collected. Conveniently, the data is stored and managed with a data management software or program to manage the person record and background information, especially if additional requests are initiated on the same individual.

Typically, a cellular wireless data network embedded in the computer, tablet or smartphone, etc., utilizes user data input and transmits individual background information from third party data sources to a user and/or a cloud server.

In one embodiment, the identity verification application device utilizes software that is a cloud-based solution that uses proprietary logic and APIs to conduct person verification and non-intrusive background checks for users on all social media platforms and dating applications for public safety. Specifically, the application uses proprietary logic and APIs to send and receive data from multiple public record data sources (i.e., third party data sources) to deliver results on an individual. The data results that are then provided to a user, will verify the individual's name, age, city, state, marital status, criminal history, social media presence, and any other information that is considered public.

In one embodiment, the mobile application allows users to input data points about an individual they want to verify to obtain a background check on. These data fields are inputted and then sent to the application platform for evaluation. The platform takes the data from the user to sanitize the data to ensure the information sent to the third party data sources has the highest rate of person location and accuracy. The data fields are inputted either directly from the user or via API. The data fields typically include first name, last name, city, state, age, year of birth, email, phone number, and other personal data to verify the individual. The data is then stored in the application database. The data is evaluated for one of two actions, to identify if a person record already exists or to create a new person record.

In one embodiment, data inputted by the user is converted to remove errors and sanitize data. Logic is then performed to translate common alias names to improve data integrity. Also, a conversion of such fields of an individual's age is translated to a year of birth for improved data logic. Additional logic to ensure data accuracy is improved, is included as well, and based on real world examples, will be applied.

In one embodiment, the data is then sent to multiple data sources via API in a waterfall design. Specifically, the first data source is contacted to locate a person's record. If the individual is not found or partial data is found, that data is then sent to a secondary data source, tertiary data source, and so on until the individual is located or all data sources are exhausted. Specifically, data is sent to third party data sources to locate a person record or criminal background information. These data sources include, person verification, criminal background checks, social media profiles, and other data sources to obtain as much data about a person as possible. The results received, then dictates if additional third party data sources are required. Further, if the results show partial or no data is found, then additional third party data sources are utilized. All data received from the multiple data sources are then inputted into the application platform for additional evaluation and application of logic to ensure accuracy of the data reports provided to the user.

In one embodiment, once a person record is located, the results are then entered into the mobile application platform to then use additional proprietary logic to ensure accuracy of the data results. This is performed by comparing the data fields entered by the user and the data results from the multiple data sources to ensure accuracy in data received, before the report is provided to the end user. Specifically, when final results are received, if multiple person records are received, then the application applies logic to filter out non-applicable results and to provide accurate reports to the user. The data received from a person verification data, background check, or social media platform allows the application logic to additionally refine the results to remove inaccurate data and ensure the person records are precise in what is displayed to the user.

In one embodiment, a report is provided to the user of the results received and the application logic applied for an easy-to-read user interface. This will include a person verification report: that includes a status of "verified, partial verified, or not verified". The fields displayed include: first name, last name, city, state, age, marital status, and other. The criminal report will provide any details associated with the individual, such as if they have an arrest, or criminal charges filed against them or pending. The social check will provide details from the top social media platforms, if they have a profile registered.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
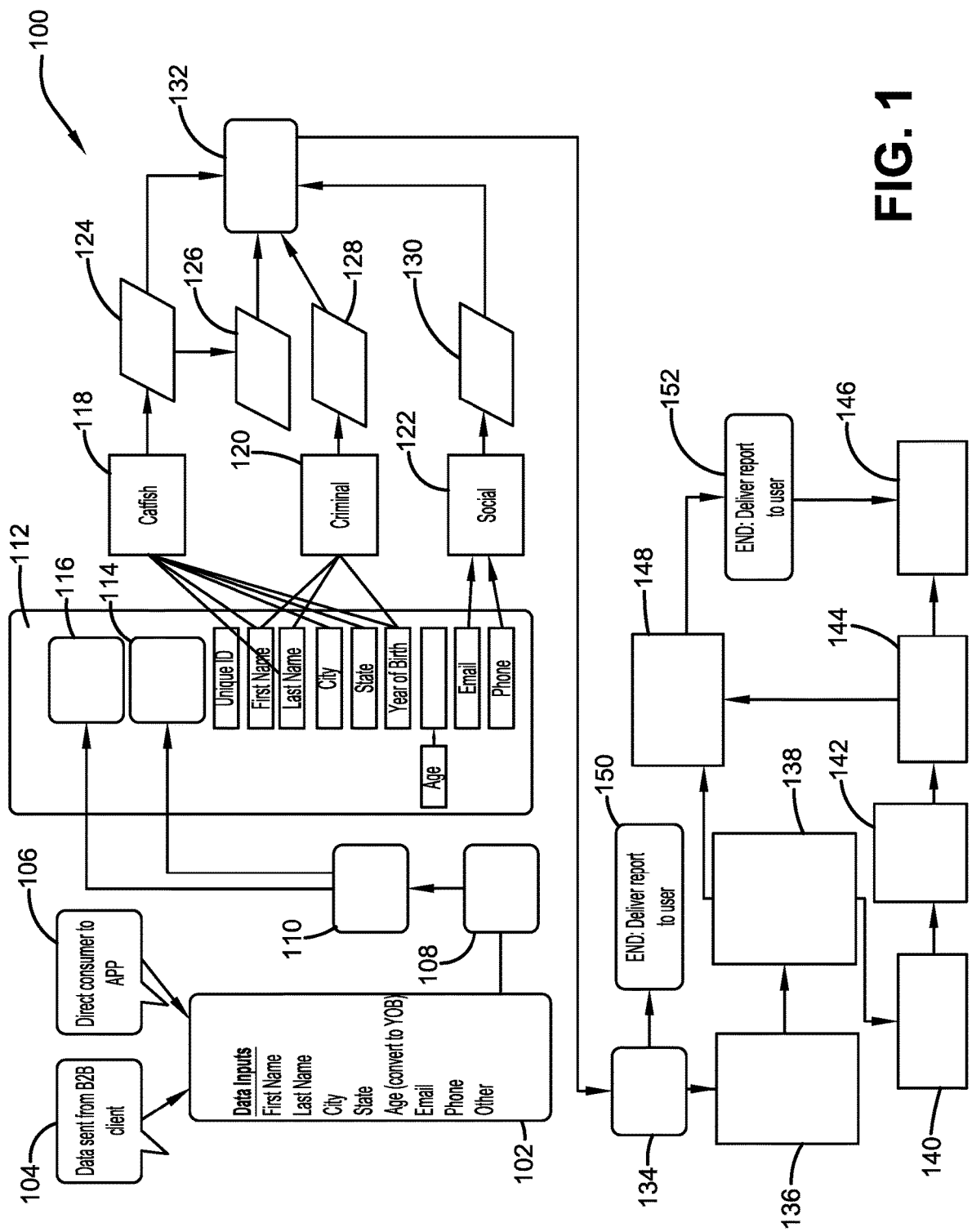
FIG. 1 illustrates a flow chart showing the method of verifying an individual's background in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an identity verification application device that provides users with a cloud-based solution that uses proprietary logic and application programming interfaces (API's) to send and receive data from multiple public record data sources to deliver results on an individual. There is also a long felt need in the art for an identity verification application device that allows users to sign up and use minimal information on an individual to conduct a thorough public safety check to help determine if a user would like to meet the individual in person. Further, there is a long felt need in the art for an identity verification application device that takes the data from the user to sanitize the data to ensure the information sent to the third party data sources has the highest rate of person location and accuracy. Moreover, there is a long felt need in the art for a device that compares the data fields entered by the user and the data results from the multiple data sources to ensure accuracy received before the report is provided to the user. Further, there is a long felt need in the art for an identity verification application device that does not require prior consent of the individual being searched. Finally, there is a long felt need in the art for an identity verification application device that provides users with identity verification and background checks for the purpose of public safety and fraud mitigation.

The present invention, in one exemplary embodiment, is a novel identity verification application device. The device provides the ability to utilize a mobile application or website to integrate multiple data sources to verify an individual's identity, criminal background, social media platform enrollment, and other data pertaining to said individual. The identity verification application device comprises user input of data fields, directly from a user or via an API. This data is then sent to third party data sources to locate person records and/or criminal background information. The results received determine if additional third party data sources are required. After all data is received from the multiple data sources, the data is inputted into the software application platform. Final results are then received and inaccurate data is filtered out. A full report is then provided to the user.

Referring initially to the drawings, FIG. 1 illustrates a flow chart showing the method of verifying an individual's background via the identity verification application device 100 of the present invention. In the present embodiment, the identity verification application device 100 is a software application that provides a user with a background check of an individual from the inputting of data points. Specifically, the identity verification application device 100 is a unique software application accessible on a smartphone, tablet, laptop, or a desktop computer (i.e., user device 200). The software application provides users with the ability to utilize a mobile application or website to integrate multiple data sources to verify an individual's identity, criminal background, social media platform enrollment, and other data pertaining to said individual. Further, the identity verification application device 100 comprises user input of data fields, directly from a user or via an API. This data is then sent to third party data sources to locate person records and/or criminal background information. The results received determine if additional third party data sources are required. After all data is received from the multiple data sources, the data is inputted into the software application platform. Final results are then received and inaccurate data is filtered out. A full report is then provided to the user.

As shown in FIG. 1, a user access the identity verification application device 100 via a smartphone, a tablet, a laptop or a desktop computer, etc., or any other suitable electronic device (i.e., user device 200 that has the required operating and memory parameters to support the software application of the present invention. Further, the device 100 can be accessed by B2B clients via API and batch file, etc.

At step 102, the user inputs data points about an individual they want to verify to obtain a background check on. These data fields are inputted and then sent to the application platform for evaluation. The application platform takes the data from the user to sanitize the data to ensure the information sent to the third party data sources has the highest rate of person location and accuracy. At steps 104 and 106, the data fields are inputted either directly from the user or via API. The data fields typically include first name, last name, city, state, age, year of birth, email, phone number, and any other suitable personal data to verify the individual. At step 108, the data is then stored in the application database. At step 110, the data is evaluated for one of two actions, to identify if a person record already exists or to create a new person record.

At step 112, data inputted by the user is converted to remove errors and sanitize data. Logic is then performed to translate common alias names to improve data integrity, such as Rich to Richard or Mike to Michael, etc. Also, a conversion of such fields of an individual's age is translated to a year of birth for improved data logic. Additional logic to ensure data accuracy is improved, is included as well, and based on real world examples, will be applied. Further, the person record that is formed from the inputted data, is then used to determine if the person record already exists and matches the data inputs 100%. If it does, then at step 114, the same unique ID person record is used and if not, then at step 116, a new person record is created.

At steps 118, 120, 122, the data is then sent to multiple data sources via API in a waterfall design. Specifically, the first data source 118 is contacted to locate a person's record. At 124, if the individual is not found or partial data is found, then at 126, that data is then sent to a secondary data source, tertiary data source, and so on until the individual is located or all data sources are exhausted. At 128, information is sent to a criminal background check database. At 130, data is sent through various social media databases, as needed. These databases are all accessed in a waterfall design, such that if data is not found or partial data is found, then a secondary data source is utilized, then a tertiary data source, etc., until all data sources are exhausted and/or the person's record is located. Specifically, data is sent to third party data sources to locate a person record, social media information, or criminal background information. These data sources include, person verification, criminal background checks, social media profiles, and other suitable data sources as is known in the art, to obtain as much data about a person as possible. The results received, then dictates if additional third party data sources are required. Further, if the results show partial or no data is found, then additional third party data sources are utilized. At 132, all data received from the multiple data sources are then inputted into the application platform for additional evaluation and application of logic to ensure accuracy of the data reports provided to the user.

At 134, for person verification, criminal background check, social media profiles, etc., once a person record (or other background record) is located, the results are then entered into the mobile application platform to then use additional proprietary logic to ensure accuracy of the data results. This is performed by comparing the data fields entered by the user and the data results from the multiple data sources to ensure accuracy in data received, before the report is provided to the end user. Specifically, as shown in steps 136-152, when final results are received, if multiple person records are received, then the application applies logic to filter out non-applicable results and to provide accurate reports to the user. For example, the multiple person records returned is cross-checked against input data, such as city and state location, or any other suitable data as is known in the art. The data received from a person verification data, background check, or social media platform allows the application logic to additionally refine the results to remove inaccurate data and ensure the person records are precise in what is displayed to the user.

Figure 2:
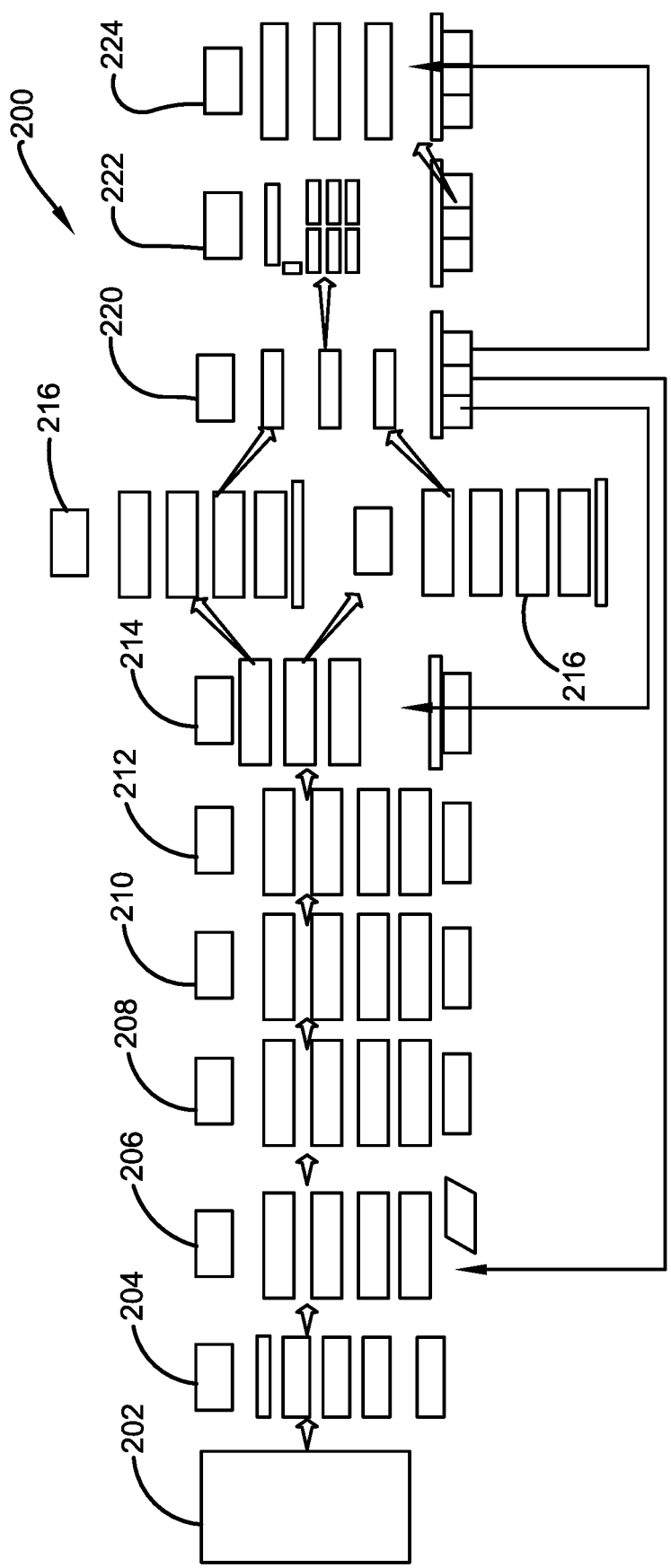
FIG. 2 illustrates a flow chart showing how the mobile application will work in accordance with the disclosed architecture.

As shown in FIG. 2, a user accesses the identity verification application device 100 via a smartphone, a tablet, a laptop or a desktop computer, etc., or any other suitable electronic device (i.e., user device 200 that has the required operating and memory parameters to support the software application of the present invention. Thus, FIG. 2 discloses how the identity verification application device 100 works on the user device 200 and the associated user screens that would be used for data input, management of results, and report displays. Specifically, at step 202, a user enters the log-in screen and at 204, a user account can be created. Then, at 206, the type of search is chosen, such as an anti-catfish (identity) search, a criminal search, a social search, or a complete search that encompasses all three searches. The data input by the user is then used to search what was selected. For example, at 208, the data is used for the anti-catfish search. At 210, the data is used for the criminal background search. At 212, the data is used for the social media search.

Then, at 214, the dashboard can be utilized to enter data and search multiple individuals. From there, as shown in 216 and 218, the input is searched simultaneously and the input variables are shown as matched or not for the individuals being searched. As shown in 220, the criminal background check is then run with the input variables. Further, as shown in 222, the social media search is then run with the input variables. Furthermore, a report is provided to the user of the results received and the application logic applied for in an easy-to-read user interface. This will include a person verification report (see 216 and 218): that includes a status of "verified, partial verified, or not verified". The fields displayed include: first name, last name, city, state, age, marital status, and other. The criminal report (see 220) will provide any details associated with the individual, such as if they have an arrest, or criminal charges filed against them or pending. The social check (see 222) will provide details from the top social media platforms, if they have a profile registered. During these searches, users can then go back and add additional individuals, or add new searches to be performed, or can return to the My Account screen. Thus, at 224, users enter the My Account screen and can update their personal information, as necessary. For example, the My Account screen allows a user to update their email and password, and log-in credentials, as needed.

Figure 3:
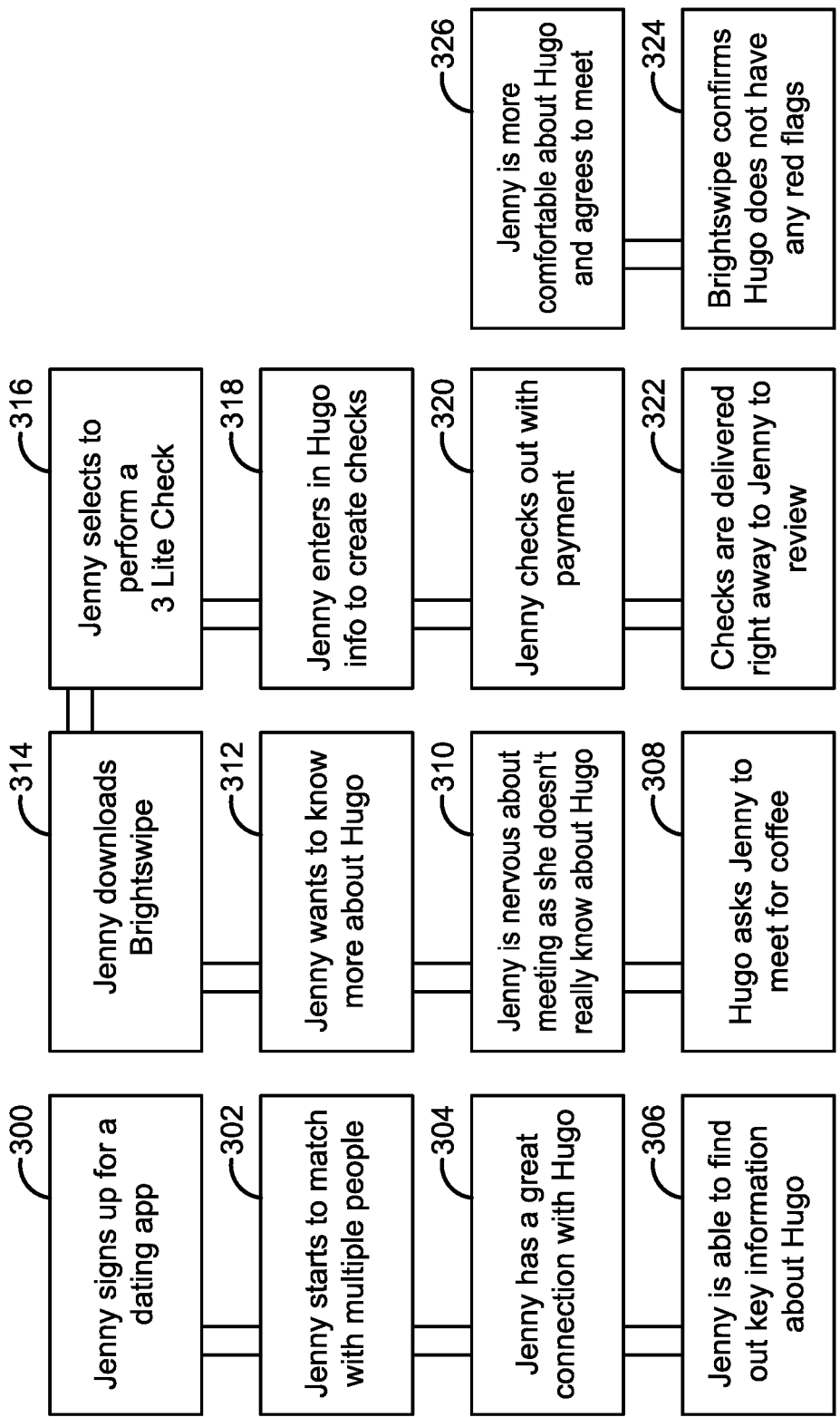
FIG. 3 illustrates a flow chart showing how a user would gain information about an individual using the identity verification application device in accordance with the disclosed architecture.

As shown in FIG. 3, a detailed use case is shown that discloses how a user would gain information about an individual utilizing the identity verification application device. For example, at 300, Jenny (i.e., the user) signs up for a dating app. Then, at 302, Jenny starts to match with multiple individuals from the dating app. Then, at 304, Jenny has a great connection with Hugo (i.e., Individual #1). At 306, through the data app and/or direct communication with Hugo, Jenny is able to find out key information about Hugo. After some conversation, at 308, Hugo asks Jenny to meet for coffee. At 310, Jenny is nervous about meeting Hugo in person, as she doesn't really know Hugo. At 312, Jenny decides that she wants to know more about Hugo. Then, at 314, Jenny learns about the identity verification application device and downloads the software application.

Accordingly, at 316, Jenny signs up for an account and selects to have performed all three life checks (i.e., anti-catfish check, criminal background check, and social media check). At 318, Jenny then enters in Hugo's name and other information to create a person record for the checks. At 320, Jenny then checks out her cart and pays for the life checks. Then, at 322, the checks are performed and delivered right away to Jenny to review. Thus, at 324, the identity verification application device confirms that Hugo does not have any red flags in any of the checks that were run. Finally, at 326, after receiving the results, Jenny is more comfortable about Hugo and agrees to meet him in person.

Generally, the identity verification application device 100 comprises a mobile computing device 200 (i.e., smart phone, computer, tablet, etc.) comprising a software application for using proprietary logic and APIs to conduct person verification and non-intrusive background checks for users for public safety. The mobile or software application provides secure website and/or smart phone app access by users for identity verification of individuals. In addition to these elements, the device 100 of the present invention may also include: a web server and Cloud database of third party data sources, proprietary logic, and APIs, connectable to the mobile smartphone or portable tablet or computer device 200 for conducting the person verification and non-intrusive background checks.

Furthermore, the person records and third party data sources and data management software is maintained on a Microsoft Cloud server in a typical fashion, or other cloud server, such as the Adobe, Apple or Amazon cloud server, etc. A secure cloud server is used for the protection and security of users and for the individual information data stored on the cloud server. Thus, the individual information, such as person verification data, background check, and social media platform presence, is sent to the cloud server and collected. Conveniently, the data is stored and managed with a data management software or program to manage the person record and background information, especially if additional requests are initiated on the same individual.

Typically, a cellular wireless data network embedded in the computer, tablet or smartphone 200, etc., utilizes user data input and transmits individual background information from third party data sources to a user and/or a cloud server. Further, for B2B clients, this can be accessed via API or batch file, etc.

Figure 4:
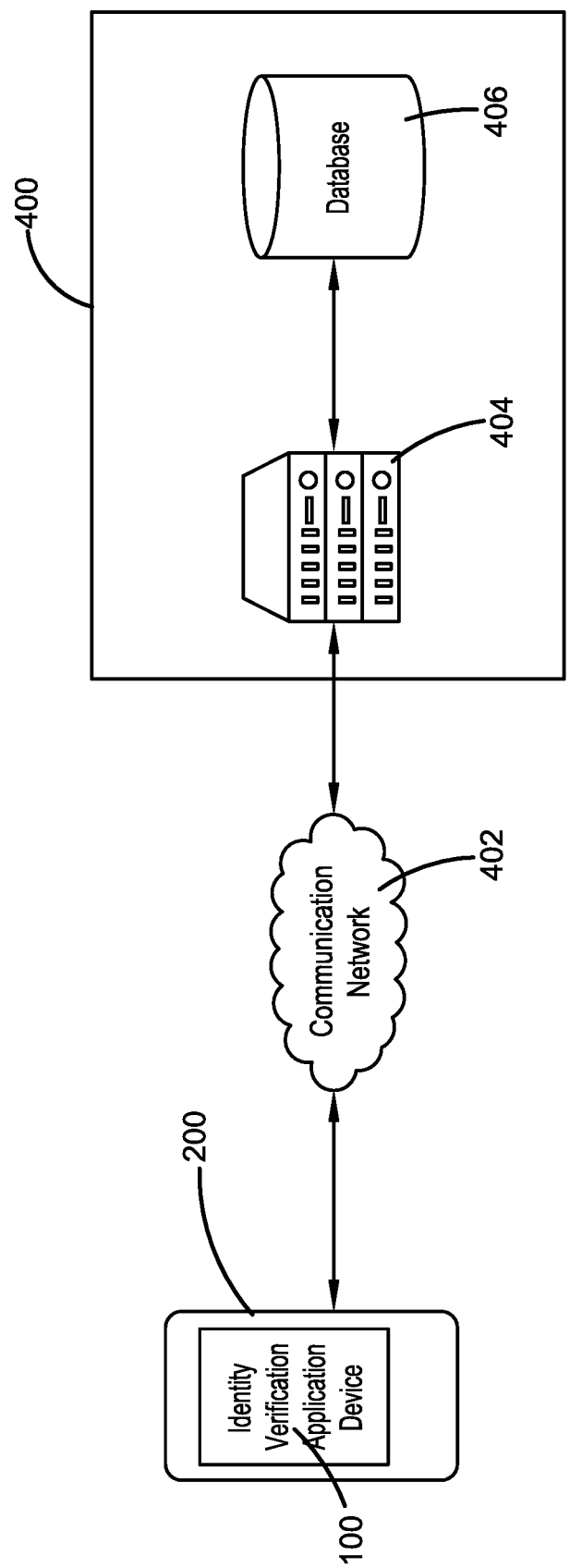
FIG. 4 illustrates a schematic diagram illustrating one embodiment of the software application for identity verification of the present invention in accordance with the disclosed architecture.

FIG. 4 is a schematic diagram illustrating one embodiment of the software application for identity verification 100 of the present invention. The application 100 has a client-server architecture wherein a user accesses the application 100 installed on a user device 200. The application 100 also comprises a server system 400 and the user device 200 is communicatively coupled to the server system 400 via a communication network 402, such as the Internet. The user device 200 is capable of facilitating a user to input data, receive data, and/or transmit data within the application 100. It will be apparent to a user of ordinary skill in the art that the user may be any personnel using the application 100, without deviating from the scope of the disclosure. Examples of the user device 200 may include, but are not limited to, a desktop, a notebook, a laptop, a handheld computer, a touch sensitive device, a tablet, a computing device, a smartphone, and/or a smart watch, etc., or any other suitable device as is known in the art.

The server system 400 is a network of computers, a software framework, or a combination thereof, that may provide a generalized approach to creating the server implementation. More specifically, the server system 400 includes an application server 404 and one or more associated databases 406. The application server 404 and the databases 406 can be integrated as a single unit or can be coupled to each other through a network. Examples of the application server 404 may include, but are not limited to, personal computers, laptops, mini-computers, mainframe computers, any non-transient and tangible machine that can execute a machine-readable code, cloud-based servers, distributed server networks, or a network of computer systems, etc. The application server 404 can be realized through various web-based technologies such as, but not limited to, a Java web-framework, a .NET framework, a personal home page (PHP) framework, or any web-application framework, etc. The server system 400 can be maintained by a storage facility management authority or a third-party entity that facilitates service enablement and resource allocation operations of the application 100.

The application server 404 is configured to have the logic, instructions, circuitry, interfaces, and/or codes for executing various operations required for communication between the server 404 and the user device 200 and also between the databases 406 and the server 404. The databases 406 are configured to store therein, data associated with users' account information from the application 100, as well as bus identification and locations, and route histories. In some embodiments, a set of centralized or distributed network of peripheral memory devices may be interfaced with the server 400, as an example, on a cloud server.

The communication network 402 may include suitable logic, circuitry, and interfaces that may be configured to provide a plurality of network ports and a plurality of communication channels for transmission and reception of data related to operations of various entities (such as the user device 200 and the server system 400) of the application 100. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 402 may be associated with an application layer for implementation of communication protocols based on one or more communication requests from the user device 200 and the server system 400. The communication data may be transmitted or received, via the communication protocols. Examples of the communication protocols may include, but are not limited to, Hypertext Transfer Protocol (HTTP), File Transfer Protocol (FTP), Simple Mail Transfer Protocol (SMTP), Domain Network System (DNS) protocol, Common Management Interface Protocol (CMIP), Transmission Control Protocol and Internet Protocol (TCP/IP), User Datagram Protocol (UDP), Long Term Evolution (LTE) communication protocols, or any combination thereof.

In one embodiment, the communication data may be transmitted or received via at least one communication channel or a plurality of communication channels in the communication network 402. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a metropolitan area network (MAN), a satellite network, the Internet, a fiber optic network, a coaxial cable network, an infrared (IR) network, a radio frequency (RF) network, and a combination thereof. Embodiments of the present invention are intended to include or otherwise cover any type of communication channel, including known, related art, and/or later developed technologies.

Figure 5:
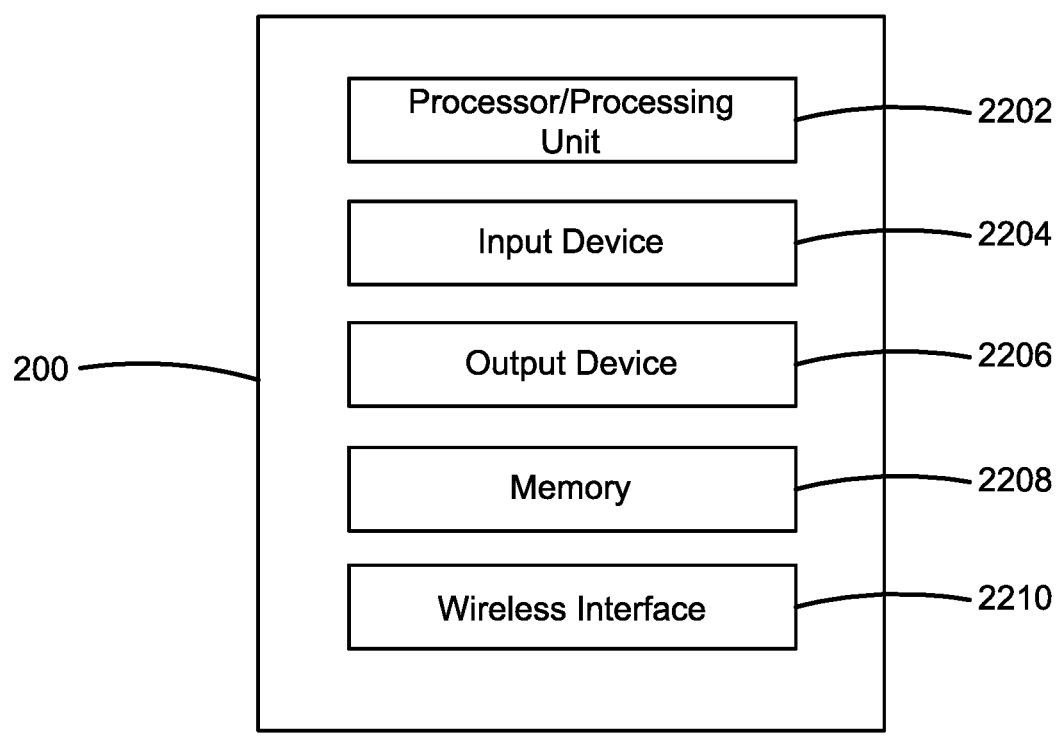
FIG. 5 illustrates an exemplary user device that is used for installing the software application for identity verification of the present invention for communication with a server system in accordance with the disclosed architecture.

FIG. 5 illustrates an exemplary user device 200 that is used for installing the software application 100 of the present invention. The processing unit 2202 may include suitable logic, instructions, circuitry, interfaces, and/or codes for executing various operations, such as the operations associated with the user device 200, etc. The processing unit 2202 may be configured to control one or more operations executed by the user device 200 in response to the input received at the user device 200 from the user. The processor 2202 executes the computer readable instructions stored in the software application. Examples of the processing unit 2202 may include, but are not limited to, an application-specific integrated circuit (ASIC) processor, a reduced instruction set computing (RISC) processor, a complex instruction set computing (CISC) processor, a field-programmable gate array (FPGA), a Programmable Logic Control unit (PLC), etc. Embodiments of the present disclosure are intended to include or otherwise cover any type of processing unit 2202 including known, related art, and/or later developed processing units. The user device 200 can further include one or more computer executable applications configured to be executed by the processing unit 2202. The one or more computer executable applications may include suitable logic, instructions, and/or codes for executing various operations. The one or more computer executable applications may be stored in the memory 2208. The one or more computer executable applications includes the software application 100.

The user device 200 comprises input device(s) 2204, such as a touch input device, a voice input device, etc., for entering data and information. Preferably, the touch interface of the user device 200 is used as the input and various buttons/tabs shown on the software application are pressed or clicked by the user.

Electronic device 200 also comprises a memory 2208 used for storing programs (sequences of instructions) or data (i.e., program state information) on a temporary or permanent basis for use in the computer system. Memory 2208 can be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. The processor 2202, in combination with one or more of memory 2208, input device(s) 2204, and output device(s) 2206 is utilized to allow users to execute instructions on the application 100. The connection to a network is provided by wireless interface 2210.

The wireless interface 2210 enables the user device 200 to communicate with the server 400 and other components of the application 100 over the communication network 402, according to embodiments of the present disclosure. Examples of the communication interface 2210 may include, but are not limited to, a modem, a network interface such as an Ethernet card, a communication port, and/or a Personal Computer Memory Card International Association (PCMCIA) slot and card, an antenna, a radio frequency (RF) transceiver, one or more amplifiers, a tuner, one or more oscillators, a digital signal processor, a coder-decoder (CODEC) chipset, a subscriber identity module (SIM) card, and a local buffer circuit, etc. It will be apparent to a user of ordinary skill in the art that the communication interface 2210 may include any device and/or apparatus capable of providing wireless or wired communications between the user device 200 and the server 400.

Embodiments of the present disclosure take the form of computer-executable instructions, including algorithms executed by a programmable computer. However, the disclosure can be practiced with other computer system configurations as well. Certain aspects of the disclosure can be embodied in a special-purpose computer or data processor that is specifically programmed, configured, or constructed to perform one or more of the computer-executable algorithms described below. Accordingly, the term "computer" as generally used herein refers to any data processor and includes Internet appliances, hand-held devices (including tablets, computers, wearable computers, cellular or mobile phones, multi-processor systems, processor-based or programmable consumer electronics, network computers, mini-computers) and the like.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "identity verification application device", "software application for identity verification", "software application", and "device" are interchangeable and refer to the identity verification application device 100 of the present invention.

Notwithstanding the forgoing, the identity verification application device 100 of the present invention can be of any suitable size and configuration as is known in the art without affecting the overall concept of the invention, provided that it accomplishes the above stated objectives. One of ordinary skill in the art will appreciate that the identity verification application device 100 as shown in FIGS. 1-5 is for illustrative purposes only, and that many other sizes and shapes of the identity verification application device 100 are well within the scope of the present disclosure. Although the dimensions of the identity verification application device 100 are important design parameters for user convenience, the identity verification application device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An identity verification application that provides a user with a background check of an individual from inputting data points, the identity verification application comprising:
    a software application; and
    a smart device;
    wherein the software application is accessible on the smart device;
    wherein the software application integrates multiple data sources to verify an individual's identity, criminal background, and social media platform enrollment; and
    wherein the software application is configured to convert the inputted data points to remove errors and to sanitize the inputted data points to improve accuracy.

2. The identity verification application of claim 1, wherein the smart device is a smartphone, tablet, laptop, or a desktop computer.

3. The identity verification application of claim 2, wherein the smart device allows for user input of data fields, directly from a user or via an API.

4. The identity verification application of claim 3, wherein the user input is then sent to third party data sources to locate person records and criminal background information.

5. The identity verification application of claim 4, wherein the smart device provides a full report to a user after searching is complete.

6. A method of providing a user with identity verification, the method comprising the following steps:
- inputting data points about an individual a user wants to verify and obtain a background check on;
- sending the data points to an application platform for evaluation;
- using a logic to translate common alias names to improve data integrity;
- sanitizing the data points ensure information sent to third party data sources has the highest rate of person location and accuracy;
- storing data in application database;
- evaluating data for one of two actions, to identify if a person record already exists or to create a new person record;
- converting data to remove errors and sanitize data;
- sending data to multiple data sources via API in a waterfall design until a complete record is located or until all data sources are exhausted;
- sending data to a criminal background check database;
- sending data to a social media database;
- inputting the data received from the multiple third party data sources into the application platform for additional evaluation and application of logic to ensure accuracy of data reports; and
- receiving a final report and sending the final report to the user.

7. The method of claim 6 further comprising a step of inputting the data fields directly from the user or via API.

8. The method of claim 7, wherein the data fields include first name, last name, city, state, age, year of birth, email, and phone number.

9. The method of claim 6 further comprising a step of determining if the person record that is formed from the inputted data already exists and matches the data inputs 100%.

10. The method of claim 9, wherein if the person record does already exist and matches 100%, then, same person record is used.

11. The method of claim 9, wherein if the person record does not already exist or doesn't match 100%, then, a new person record is created.

12. The method of claim 6, wherein a first data source is contacted to locate a person's record.

13. The method of claim 12, wherein if the individual is not found or partial data is found, then a secondary data source is utilized.

14. The method of claim 13, wherein if the individual is not found or partial data is found, then a tertiary data source is utilized.

15. The method of claim 9, wherein the third party data sources include, person verification, criminal background checks, and social media profiles.

16. The method of claim 9, wherein when final results are received, if multiple person records are received, then the application applies logic to filter out non-applicable results and to provide accurate reports to the user.

17. A method of accessing the identity verification application device via a smart device, the method comprising the following steps:
- entering log-in screen and creating an account;
- choosing type of search wanted;
- inputting data for search;
- utilizing dashboard to enter data and search multiple individuals;
- searching entered data through third party databases in a waterfall design until a complete record is located or until all data sources are exhausted; and
- providing a report to the user of results received; and
- wherein the type of search wanted comprises an anti-catfish search, a criminal search, and a social search.

18. The method of claim 17, wherein the report includes a person verification report that includes a status of "verified, partial verified, or not verified" for fields displayed.

19. The method of claim 18, wherein the fields displayed include: first name, last name, city, state, age, and marital status.

* * * * *